(12) United States Patent
Kim et al.

(10) Patent No.: US 11,502,355 B2
(45) Date of Patent: Nov. 15, 2022

(54) METAL AIR BATTERY

(71) Applicants: HYUNDAI MOTOR COMPANY, Seoul (KR); KIA CORPORATION, Seoul (KR)

(72) Inventors: Jin Soo Kim, Suwon-Si (KR); Jong Chan Song, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 16 days.

(21) Appl. No.: 17/365,263

(22) Filed: Jul. 1, 2021

(65) Prior Publication Data

US 2021/0328287 A1 Oct. 21, 2021

Related U.S. Application Data

(62) Division of application No. 16/161,767, filed on Oct. 16, 2018, now Pat. No. 11,081,745.

(30) Foreign Application Priority Data

Dec. 21, 2017 (KR) ........................ 10-2017-0176672

(51) Int. Cl.
*H01M 12/02* (2006.01)
*H01M 12/08* (2006.01)
*H01M 10/42* (2006.01)
*H01F 7/02* (2006.01)

(52) U.S. Cl.
CPC .......... *H01M 12/02* (2013.01); *H01F 7/0294* (2013.01); *H01M 10/425* (2013.01); *H01M 10/4207* (2013.01); *H01M 12/08* (2013.01); *H01M 2220/20* (2013.01); *H01M 2250/20* (2013.01)

(58) Field of Classification Search
None
See application file for complete search history.

(56) References Cited

U.S. PATENT DOCUMENTS

| | | |
|---|---|---|
| 2009/0322221 A1 | 12/2009 | Makansi |
| 2011/0049659 A1 | 3/2011 | Suzuki |
| 2013/0323541 A1 | 12/2013 | Mizuno |
| 2016/0087259 A1* | 3/2016 | Song .................. H01M 50/543 429/10 |
| 2018/0097234 A1 | 4/2018 | Adachi |
| 2018/0304416 A1 | 10/2018 | Newman |

OTHER PUBLICATIONS

U.S. Notice of Allowance dated Apr. 1, 2021 issued in U.S. Appl. No. 16/161,767.
U.S. Non-Final Office Action dated Nov. 24, 2020 issued in U.S. Appl. No. 16/161,767.

* cited by examiner

*Primary Examiner* — Wyatt P McConnell
(74) *Attorney, Agent, or Firm* — Morgan, Lewis & Bockius LLP

(57) ABSTRACT

A metal air battery includes: cells, each of which includes a positive electrode, an negative electrode, and an electrolyte layer located between the positive electrode and the negative electrode; and a magnetic field generator configured to form a magnetic field in the cells. The magnetic field generator comprises a permanent magnet attached to one of the positive electrode and the negative electrode.

6 Claims, 3 Drawing Sheets

[FIG. 1]
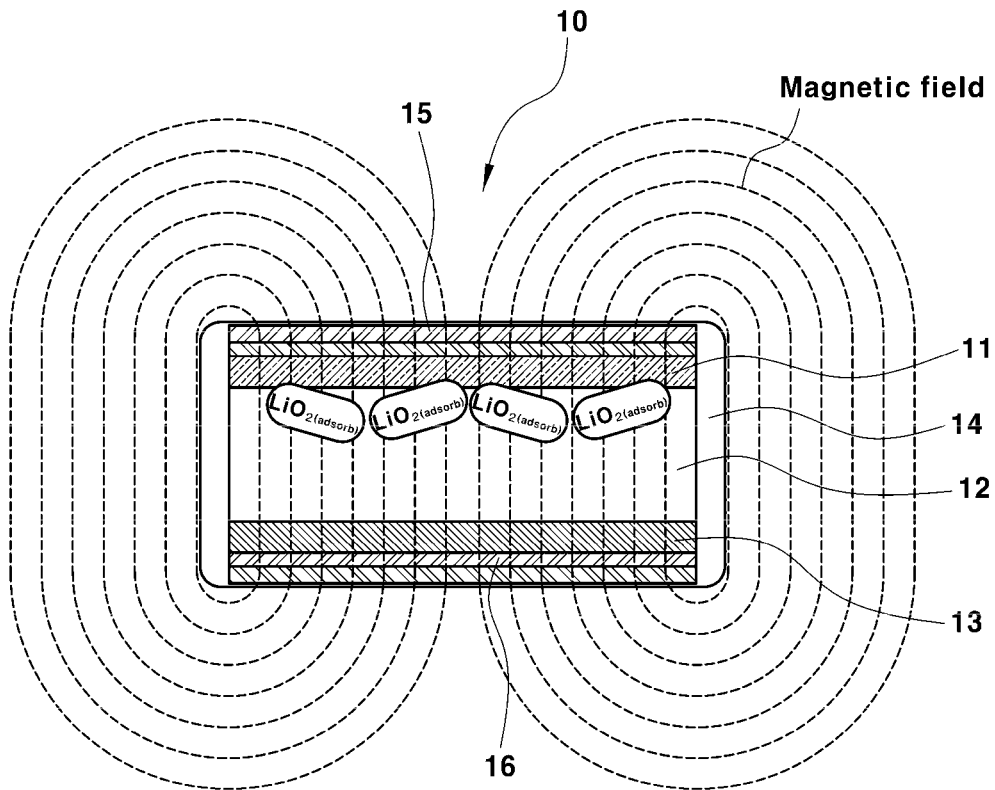
[FIG. 2]
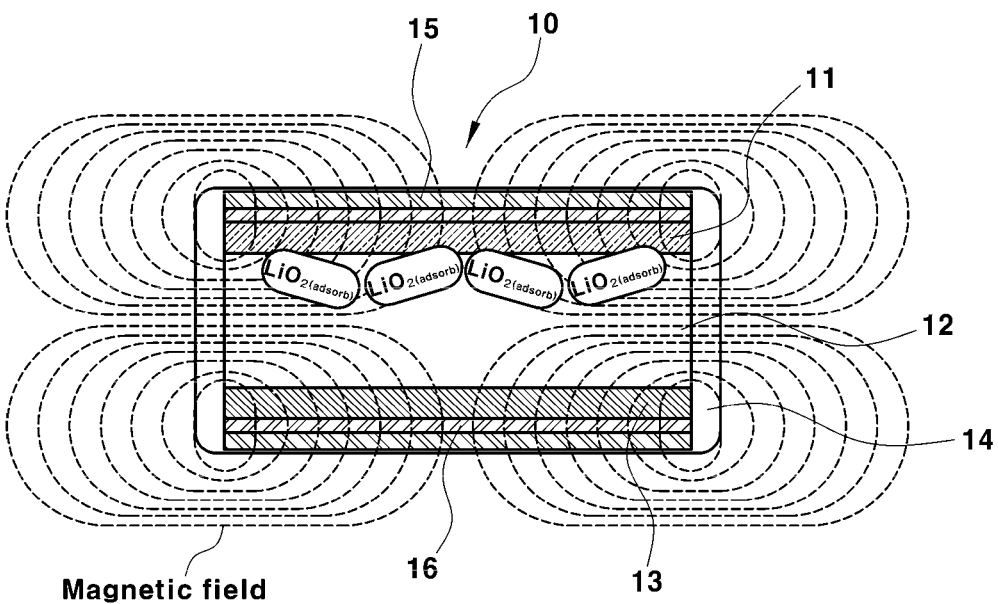

[FIG. 3]
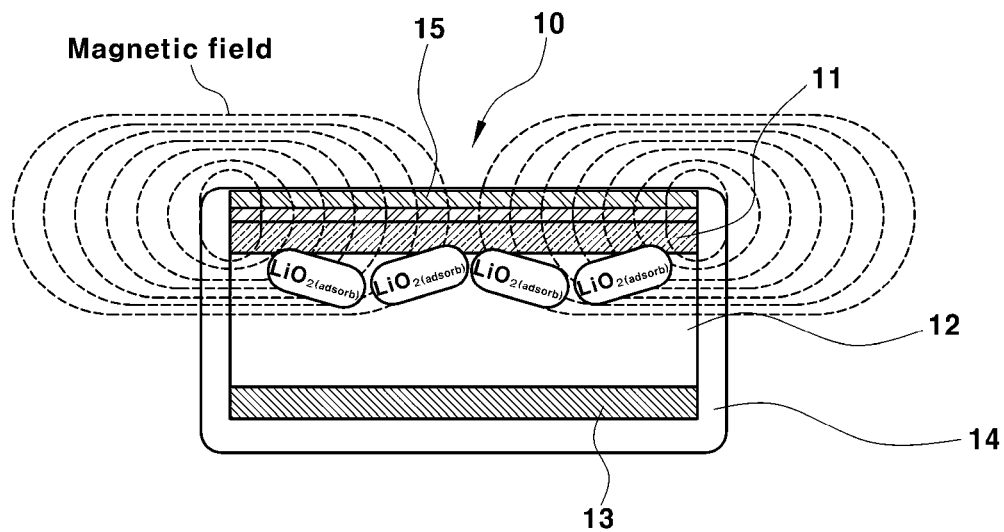
[FIG. 4]
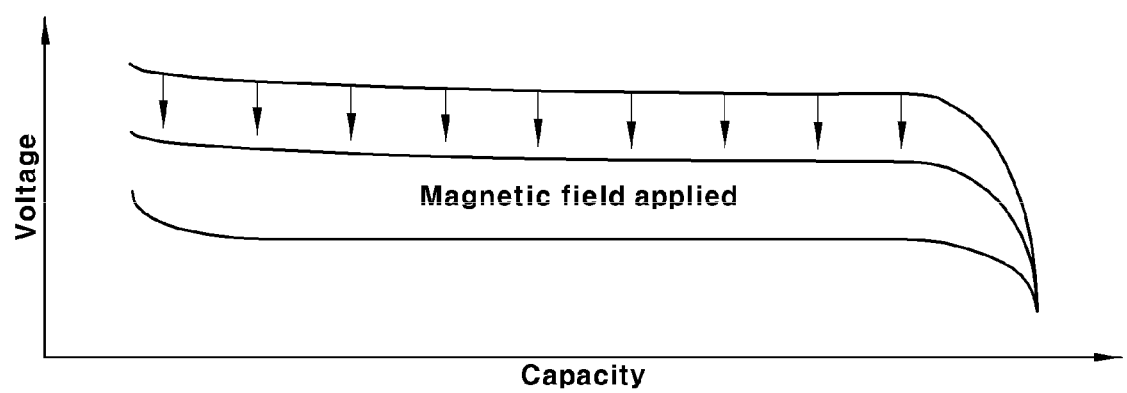

[FIG. 5]
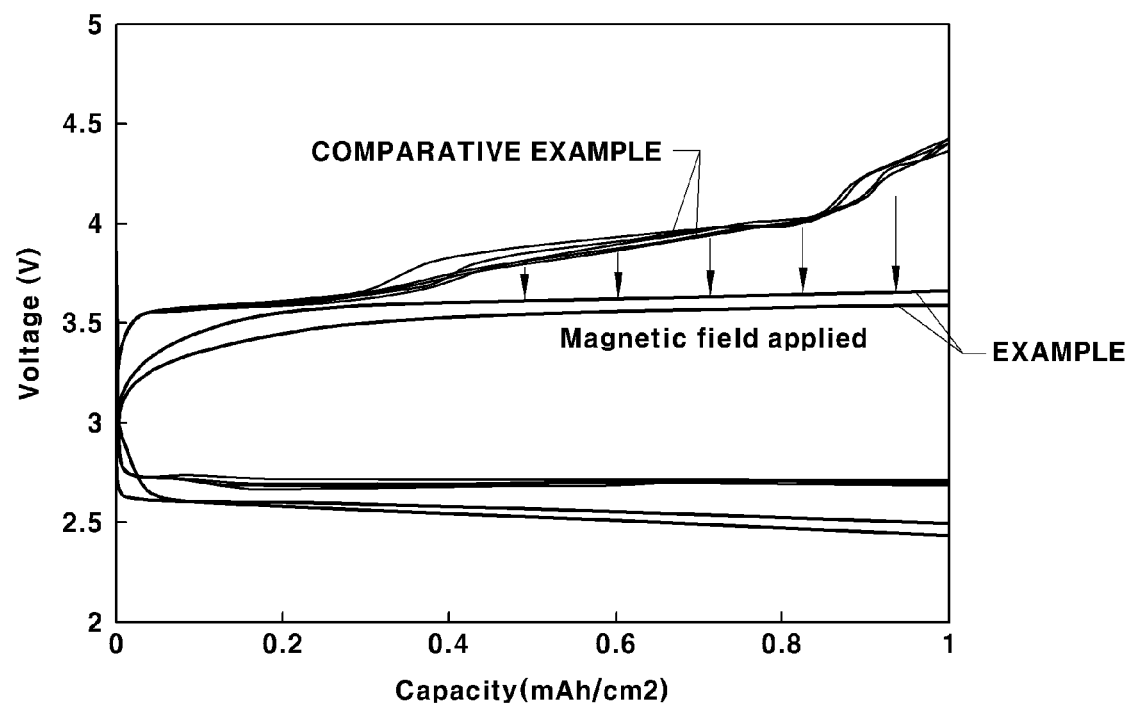

METAL AIR BATTERY

CROSS-REFERENCE TO RELATED APPLICATION

This application is a divisional of U.S. patent application Ser. No. 16/161,767, filed on Oct. 16, 2018 which claims priority to Korean Patent Application No. 10-2017-0176672 filed on Dec. 21, 2017, the entire contents of which are incorporated herein by reference.

TECHNICAL FIELD

The present disclosure relates to a metal air battery. More particularly, the present disclosure relates to a metal air battery in which generation of a material having low electrical conductivity at a positive electrode at the time of discharge of the metal air battery can be suppressed through stabilization of an intermediate reaction product having excellent electrical conductivity and control of overall reaction.

BACKGROUND

Recently, metal air batteries have been implementing a high energy density and are thus spotlighted as next-generation secondary batteries for vehicles.

Particularly, among metal air batteries, a lithium air battery theoretically has a high capacity which is 10 times or more the capacity of a conventional lithium ion battery and is thus spotlighted as a next-generation middle or large battery now.

While the lithium ion battery has an energy density of about 200 Wh/kg in a saturation state, the lithium air battery may implement a higher energy density than the lithium ion battery and is thus a secondary battery which satisfies requirements as a next-generation energy storage device.

In the lithium air battery, an active carbon-based material is basically used as a positive electrode material, lithium ions come into contact with oxygen and form lithium oxides, such as $Li_2O_2$, $LiO_2$, $Li_2O$, etc., and thus the lithium air battery is discharged, and then, charging of the lithium air battery is carried out by decomposing such discharge products.

However, metal air batteries, such as the above-described lithium air battery, have a high possibility of changing a paradigm as next-generation energy storage devices having a high-energy density, but are still difficult to implement.

Particularly, over-voltage of 1 V or more when the lithium air battery is charged may occur due to low electrical conductivity of lithium peroxide ($Li_2O_2$) generated at a positive electrode of the lithium air battery at the time of discharge of the lithium air battery, and thereby, various electrochemical side reactions, such as degradation of an electrolyte and the carbon positive electrode, may occur.

Thereby, reversibility of the lithium air battery is hindered, thus restricting or shortening battery lifespan.

Therefore, technology to control overall reaction of a lithium air battery has been required, but research on reduction in over-voltage when a lithium air battery is charged, by stabilizing the state of an intermediate reaction product, has not been reported yet.

In relation to intermediate reaction products, research on improvement in capacity through inducement to solvation of an intermediate reaction product of a lithium air battery by controlling electrolyte conditions using a method, such as using a polar solvent or by providing water, has been reported in the academic world.

However, in the corresponding research, since control of the state of the intermediate reaction product of the lithium air battery is not emphasized but only control of a reaction path is emphasized, lithium peroxide is generated in the same manner as the conventional methods, and thus, the typical problem of the lithium air battery, i.e., high over-voltage in charging the lithium air battery, is not greatly improved.

Further, several methods using a solid catalyst or an oxidation/reduction chemical species have been reported as research to lower over-voltage when a lithium air battery is charged. However, in the corresponding methods, over-voltage is reduced by effectively decomposing lithium peroxide, which was already generated, and during such a process, not only lithium peroxide but also an electrolyte reacts and side reactions occurring when the lithium air battery is charged become severe.

SUMMARY OF THE DISCLOSURE

The present disclosure has been made in an effort to solve the above-described problems associated with the prior art, and an object of the present disclosure is to provide a metal air battery in which generation of a material having low electrical conductivity at a positive electrode at the time of discharge of the metal air battery may be suppressed through stabilization of an intermediate reaction product having excellent electrical conductivity and control of overall reaction, and thereby, over-voltage in charging the battery may be reduced, side reactions of electrochemical high-voltage oxidation may be suppressed and thus charge and discharge characteristics may be improved.

In one aspect, the present disclosure provides a metal air battery including cells, each of which comprising a positive electrode, an negative electrode, and an electrolyte layer located between the positive electrode and the negative electrode, and a magnetic field generator configured to generate a magnetic field in the cells.

The magnetic field generator may include permanent magnets attached to one of the positive electrode and the negative electrode.

The magnetic field generator may include two permanent magnets attached to both the positive electrode and the negative electrode.

The magnetic field generator may include permanent magnets installed at the outside of a case to accommodate the cells.

The magnetic field generator may include permanent magnets installed at the inside of the case to accommodate the cells.

The magnetic field generator may include two permanent magnets located at both sides of the metal air battery and aligned in an attractive force generation direction so as to form a magnetic field exerting attractive force in the cells.

The magnetic field generator may include two permanent magnets located at both sides of the metal air battery and aligned in a repulsive force generation direction so as to form a magnetic field exerting repulsive force in the cells.

Other aspects and exemplary embodiments of the invention are discussed infra.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIGS. 1, 2 and 3 are schematic cross-sectional views of metal air batteries in accordance with embodiments of the present disclosure;

FIG. 4 is a graph illustrating discharge reaction caused by applying permanent magnets to a lithium air battery in accordance with one embodiment of the present disclosure; and FIG. 5 is a graph illustrating relations between capacity and voltage when a lithium air battery in an example of the present disclosure and a lithium air battery in a comparative example are repeatedly charged and discharged.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

In the following description of the embodiments, the terms "including" and "having" will be interpreted as indicating presence of one or more other characteristics, numbers, steps, operations, elements or parts stated in the specification or combinations thereof, and do not exclude presence of characteristics, numbers, steps, operations, elements, parts or combinations thereof, or possibility of adding the same.

The present disclosure provides a metal air battery in which generation of a material ($Li_2O_2$) having low electrical conductivity at a positive electrode at the time of discharge of the metal air battery may be suppressed through stabilization of an intermediate reaction product ($LiO_2$) having excellent electrical conductivity and control of overall reaction, and thereby, over-voltage in charging the battery may be reduced, side reactions of electrochemical high-voltage oxidation may be suppressed and thus charge and discharge characteristics may be improved.

For this purpose, in order to stably discharge the metal air battery in accordance with the present disclosure, a magnetic field applying device which may apply and form a magnetic field in a cell is used.

In the present disclosure, by forming and applying a magnetic field to the inside of the cell, generation of lithium peroxide ($Li_2O_2$) having low electrical conductivity at the positive electrode at the time of discharge of the metal air battery may be suppressed through magnetic stabilization of a magnetized intermediate reaction product ($LiO_2$) and control of overall reaction, and thereby, over-voltage in charging the battery may be reduced.

For reference, in the case of a general lithium air battery, a stable material generated at a positive electrode at the time of discharge of the lithium air battery, i.e., lithium peroxide ($Li_2O_2$), is not readily decomposed, and thus, a large amount of energy is required at the time of charge of the lithium air battery.

According to recent study, technology, in which, by changing a charge and discharge mechanism of a conventional lithium air battery using an iridium nano-catalyst, etc., lithium superoxide ($LiO_2$) corresponding to an intermediate material is generated at the time of discharge of the lithium air battery, instead of generation of lithium peroxide ($Li_2O_2$), and change from lithium superoxide ($LiO_2$) to lithium peroxide ($Li_2O_2$) is prevented, has been developed.

However, such technology requires use of an additional catalyst.

On the contrary, the present disclosure may solve the conventional problems simply by installing the magnetic field applying device which may form and apply a magnetic field to the inside of a cell.

That is, magnetic stabilization of an intermediate reaction product ($LiO_2$) having excellent electrical conductivity may be induced and generation of a material ($Li_2O_2$) having low electrical conductivity may be suppressed simply by installing the magnetic field applying device, such as permanent magnets, in the metal air battery, and thus, effects, such as saving of energy required to charge the metal air battery, improvement in energy efficiency, suppression of side reactions of electrochemical high-voltage oxidation, improvement in charge and discharge characteristics and prolongation of battery lifespan, may be acquired.

Hereinafter, although a lithium air battery will be exemplarily described, the metal air battery in accordance with the present disclosure is not limited to the lithium air battery and may be a sodium air battery or a potassium air battery which generates a similar reaction product to the lithium air battery.

Now, the metal air battery in accordance with the present disclosure will be described with reference to the accompanying drawings.

FIGS. 1 and 2 are schematic cross-sectional views of metal air batteries in accordance with embodiments of the present disclosure.

As exemplarily shown in FIGS. 1 and 2, a metal air battery 10 in accordance with one embodiment of the present disclosure includes a porous carbon positive electrode 11, an electrolyte layer 12, and a lithium metal negative electrode 13.

Here, the electrolyte layer 12 is located between the positive electrode 11 and the negative electrode 13, and the electrolyte layer 12 includes an electrolyte.

For example, the metal air battery 10 may be a lithium air battery. Hereinafter, the lithium air battery will be exemplarily described as the metal air battery 10.

The lithium air battery 10 is a battery system in which oxygen in air is used as an active material of the positive electrode 11 and lithium is used as the negative electrode 13, reduction and oxidation reactions of oxygen introduced from the outside occur at the positive electrode 11, and oxidation and reduction reactions of lithium occur at the negative electrode 13.

The positive electrode 11 is porous, and thus, external air may be introduced into the positive electrode 11. At the time of discharge of the lithium air battery 10, oxygen included in the external air is reduced by electrons at the positive electrode 11, and lithium is oxidized into lithium ions and electrons at the negative electrode 13.

The lithium ions move to the positive electrode 11 through the electrolyte layer 12, and the electrons move to the positive electrode 11 through a current collector and external wires.

Charge of the lithium air battery 10 is carried out in opposition to discharge of the lithium air battery 10, and lithium oxide is decomposed into lithium ions and electrons at the positive electrode 11.

The electrolyte layer 12 may include a solid electrolyte or a liquid electrolyte, and for example, the electrolyte may be a lithium electrolyte, and more particularly, a lithium salt electrolyte including a general non-aqueous organic solvent.

The electrolyte layer 12 may include, for example, a sulfide-based electrolyte, an oxide-based electrolyte or a polymer electrolyte, and "~based electrolyte" may mean an electrolyte including a compound named "~".

The electrolyte layer 12 may serve as a source of lithium ions in the metal air battery 10, and serve to promote movement of lithium ions with the negative electrode 13.

The metal air battery 10 in accordance with the embodiment of the present disclosure may include a case 14 in the same manner as a conventional metal air battery, and a cell including the positive electrode 11, the electrolyte layer 12 and the negative electrode 13 is accommodated in the case 14.

Further, the metal air battery 10 in accordance with the embodiment of the present disclosure may include a magnetic field applying structure which may form and apply a magnetic field to the inside of the cell, and the magnetic field applying structure may include permanent magnets 15 and 16 installed in the metal air battery 10.

In the present disclosure, any magnetic material may be applied to the permanent magnets 15 and 16, and the permanent magnets 15 and 16 may be formed of a ferromagnetic material or superferromagnetic material, and more particularly, a crystalline magnetic material.

For example, at least one selected from the group consisting of permanent magnets having ferrite, magnetite, hematite, maghemite, jacobsite, trevorite, magnesioferrite, pyrrhotite, greigite, feroxyhyte, awaruite and wairauite-based crystalline structures, may be used.

In addition, neodymium magnets may be used as the permanent magnets 15 and 16 of the magnetic field applying structure in accordance with the present disclosure.

Further, permanent magnets having an intensity of magnetism of about 50-15,000 G may be used as permanent magnets 15 and 16 in accordance with the present disclosure.

Further, the permanent magnets 15 and 16 in accordance with the present disclosure, as exemplarily shown in FIGS. 1 and 2, may be installed at each of the positive electrode 11 formed of porous carbon and the negative electrode 13 including lithium and be attached to the surfaces of the positive electrode 11 and the negative electrode 13 within the case 14.

With reference to FIGS. 1 and 2, the permanent magnets 15 and 16 are attached to the surfaces of the positive electrode 11 and the negative electrode 13 within the case 14. Here, the permanent magnets 15 and 16 are fixed such that the permanent magnets 15 and 16 are interposed between the inner surface of the case 14 and the surface of the positive electrode 11 and between the inner surface of the case 14 and the surface of the negative electrode 13.

Otherwise, in the present disclosure, permanent magnets, as exemplarily shown in FIG. 3, may be installed only at the positive electrode 11 or only at the negative electrode 13. In this case, the permanent magnets may be installed so as to be attached to the surface of the positive electrode 11 or the negative electrode 13, and be installed so as to be interposed between the surface of the positive electrode 11 or the negative electrode 13 and the inner surface of the case 14.

Further, permanent magnets may be installed so as to be fixed to the outside of the case 14 not to the inside of the case 14. In this case, the permanent magnets may be installed at regions of the outer surface of the case 14 where the positive electrode 11 and the negative electrode 13 are disposed, or be installed so as to be attached or fixed to a region of the outer surface of the case 14 where the positive electrode 11 or the negative electrode 13 is disposed.

Further, a metal air battery including a plurality of unit cells may be provided. Here, each unit cell includes a porous carbon positive electrode, an electrolyte layer and a lithium metal negative electrode, and the unit cells are stacked such that a separator is interposed between the unit cells.

In this case, permanent magnets may be disposed at the positive electrode or the negative electrode of each cell, or at both the positive electrode and the negative electrode of each cell so that a magnetic field may be applied to the inside of each cell.

As long as permanent magnets serving as a structure forming cells may be installed at the inside of a case or at the outside of the case and the permanent magnets may apply a magnetic field to the insides of cells, the positions of the permanent magnets are not limited to the inside or the outside of the case.

Further, as long as the permanent magnets may be fixed to an installation part, the permanent magnets are not limited to a specific mounting method and may use an insertion method using mounts or clips, a screw engagement method, an attachment method, etc.

Moreover, the present disclosure may provide metal air batteries in accordance with various embodiments in which magnetic field application and alignment directions are varied so as to control the direction of attractive force by interaction between electric fields and magnetic fields.

FIG. 1 illustrates a metal air battery 10 in accordance with one embodiment of the present disclosure, in which installation of the permanent magnets 15 and 16 at the positive electrode 11 and the negative electrode 13 and magnetic field alignment are carried out in an attractive force generation direction so as to apply a magnetic field exerting attraction (attractive force) to the inside of the cell.

Further, FIG. 2 illustrates a metal air battery 10 in accordance with another embodiment of the present disclosure, in which installation of the permanent magnets 15 and 16 at the positive electrode 11 and the negative electrode 13 and magnetic field alignment are carried out in a repulsive force generation direction so as to apply a magnetic field exerting repulsion (repulsive force) to the inside of the cell.

As exemplarily shown in FIG. 2, in addition to installation of the permanent magnets 15 and 16 so as to generate repulsive force between both sides of the permanent magnets 15 installed at the positive electrode 11 and both sides of the permanent magnets 16 installed at the negative electrode 13, the permanent magnets 15 may be installed so as to generate repulsive force between the permanent magnets 15 installed at the positive electrode 11 and the permanent magnets 16 may be installed so as to generate repulsive force between the permanent magnets 16 installed at the negative electrode 13.

That is, as exemplarily shown in FIG. 2, the permanent magnets 15 and 16 may be installed so as to generative repulsive force between the permanent magnets installed at the left and the permanent magnets installed at the right, out of the permanent magnets 15 or 16 installed at the same pole.

If permanent magnets are installed so as to apply a magnetic field exerting repulsive force, as described above, the permanent magnets may be installed at only one of the positive electrode 11 and the negative electrode 13.

If the permanent magnets 15 and 16 are disposed such that the poles thereof drawing an intermediate reaction product face each other, a magnetic barrier is formed at a middle point therebetween (due to opposite polarity) and thus the intermediate reaction product may not move to the middle point.

On the other hand, if the permanent magnets 15 and 16 are disposed such that the poles thereof pushing the intermediate reaction product face each other, a layer to collect the intermediate reaction product is formed at the middle point therebetween.

In the two cases, diffusion of the intermediate reaction product within the case 14 is suppressed and thus the intermediate reaction product is spatially confined within the cell, and consequently, the magnetized intermediate reaction product, i.e., lithium superoxide ($LiO_2$) having relatively excellent electrical conductivity may be magnetically stabilized and thus generation of lithium peroxide ($Li_2O_2$) from lithium superoxide ($LiO_2$) may be suppressed.

Further, as exemplarily shown in FIG. 3, if permanent magnets are installed only at the positive electrode 11 or the negative electrode 13, a magnetic field of only one direction is formed within the cell. Here, the magnetic field is not aligned in a line and may be bent, but shows a similar state to the magnetic field alignment state generating attractive force shown in FIG. 1.

As such, the permanent magnets installed only at the positive electrode 11 or the negative electrode 13 are effective in terms of effects, such as suppression of generation of lithium peroxide and reduction of over-voltage in charging the battery, in the same manner as the permanent magnets installed both at the positive electrode 11 and the negative electrode 13, and have the same mechanism as the permanent magnets installed both at the positive electrode 11 and the negative electrode 13.

In a lithium air battery, an intermediate reaction product, i.e., lithium superoxide ($LiO_2$), is generated at a positive electrode at the time of discharge of the lithium air battery, and the intermediate reaction product activates a magnetic field due to surplus electrons in a molecular structure thereof and may thus be regarded as a kind of radical.

Such molecules have high solubility, and thus, are not precipitated as a solid phase and are eluted in a surrounding electrolyte. Thereby, they may deteriorate electrolyte solvent molecules or be diffused to an negative electrode of the lithium air battery and disturb oxidation/reduction of lithium ions.

Therefore, in the present disclosure, in order to solve such problems, a magnetic field applying structure including permanent magnets is installed so as to form a magnetic field in a cell of a lithium air battery, thereby preventing diffusion of an intermediate reaction product ($LiO_2$) with partial charges and thus promoting suppression of side reactions and improvement in charge efficiency.

Lithium superoxide ($LiO_2$) corresponding to the intermediate reaction product of the lithium air battery has relatively excellent electrical conductivity, as compared to lithium peroxide ($Li_2O_2$), and thus generates low over-voltage in charging the battery. Therefore, the present disclosure may stabilize the intermediate reaction product and suppress diffusion of the intermediate reaction product through a magnetic method, thus improving charge efficiency.

FIG. 4 is a graph illustrating discharge reaction caused by applying permanent magnets to a lithium air battery in accordance with one embodiment of the present disclosure, and the graph of FIG. 4 illustrates relations between capacity and voltage.

As exemplarily shown in FIG. 4, if the permanent magnets are used to apply a magnetic field to the inside of a cell, voltage in the discharge reaction of the lithium air battery may be lowered, as compared to if no permanent magnets are used.

FIG. 5 is a graph illustrating relations between capacity and voltage when a lithium air battery in an example of the present disclosure and a lithium air battery in a comparative example are repeatedly charged and discharged.

In the lithium air battery in the example, neodymium magnets were attached to outer surfaces of a case where a positive electrode and an negative electrode are disposed so as to apply a magnetic field to the inside of a cell of the lithium air battery. In the lithium air battery in the example, lithium was used as the negative electrode, carbon paper prepared through casting of carbon black powder, i.e., Ketjen black, was used as the positive electrode, and 1M $LiNO_3$ in dimethylacetamide (DMAc) was used as an electrolyte layer.

The lithium air battery in the comparative example was the same as the lithium air battery in the example except that the lithium air battery in the comparative example does not use permanent magnets.

In a test, the lithium air battery in the example and the lithium air battery in the comparative example were repeatedly charged and discharged by applying current of 0.5 $mA/cm^2$ under a capacity condition of 1 $mAh/cm^2$.

For comparison, it may be confirmed that charge and discharge voltages of the lithium air battery in the example, in which a magnetic field is applied by the permanent magnets, are lower than charge and discharge voltages of the lithium air battery in the comparative example.

As such, in a metal air battery in accordance with the present disclosure, permanent magnets are used to form a magnetic field in a cell, and thereby, an intermediate reaction product generated at a positive electrode at the time of discharge of the metal air battery, i.e., lithium superoxide ($LiO_2$), may be magnetized and thus magnetically stabilized and thereby generation of a final product, i.e., lithium peroxide ($Li_2O_2$), may be suppressed.

Consequently, over-voltage when the metal air battery is charged may be reduced, and effects, such as saving of energy required to charge the metal air battery, improvement in energy efficiency, suppression of side reactions of electrochemical high-voltage oxidation, improvement in charge and discharge characteristics and prolongation of battery lifespan, may be acquired.

As is apparent from the above description, in a metal air battery in accordance with the present disclosure, permanent magnets are used to form a magnetic field in a cell, and thereby, an intermediate reaction product generated at a positive electrode at the time of discharge of the metal air battery, i.e., lithium superoxide ($LiO_2$), may be magnetized and thus magnetically stabilized and thereby generation of a final product, i.e., lithium peroxide ($Li_2O_2$), may be suppressed.

Consequently, over-voltage when the metal air battery is charged may be reduced, and effects, such as saving of energy required to charge the metal air battery, improvement in energy efficiency, suppression of side reactions of electrochemical high-voltage oxidation, improvement in charge and discharge characteristics and prolongation of battery lifespan, may be acquired.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A metal air battery comprising:
   cells, each of which comprising a positive electrode, a negative electrode, and an electrolyte layer disposed between the positive electrode and the negative electrode;
   a magnetic field generator configured to apply a magnetic field to an inside of the cells; and
   a case configured to accommodate the cells,
   wherein the magnetic field generator comprises two permanent magnets, one of which is installed at a region of the outer surface of the case where the positive electrode is disposed and the other of which is installed at a region of the outer surface of the case where the negative electrode is disposed.

2. The metal air battery of claim 1, wherein the permanent magnet installed at region of the outer surface of the case where the positive electrode is disposed and the permanent magnet installed at region of the outer surface of the case where the negative electrode is disposed are aligned in an attractive force generation direction to generate a magnetic field exerting attractive force in the cells.

3. The metal air battery of claim 1, wherein the permanent magnet installed at region of the outer surface of the case where the positive electrode is disposed and the permanent magnet installed at region of the outer surface of the case where the negative electrode is disposed are aligned in a repulsive force generation direction to generate a magnetic field exerting repulsive force in the cells.

4. The metal air battery of claim 1, wherein the two permanent magnets of the magnetic field generator comprise a permanent magnet having an intensity of magnetism of about 50-15,000 G.

5. The metal air battery of claim 1, wherein the two permanent magnets of the magnetic field generator comprise a permanent magnet having at least one selected from the group consisting of ferrite, magnetite, hematite, maghemite, jacobsite, trevorite, magnesioferrite, pyrrohotite, greigite, feroxyhyte, awaruite, and wairauite-based crystalline structures.

6. The metal air battery of claim 1, wherein the two permanent magnets of the magnetic field generator comprise neodymium magnets.

* * * * *